United States Patent
Elswick et al.

(10) Patent No.: US 6,856,240 B1
(45) Date of Patent: Feb. 15, 2005

(54) BROADCAST MESSAGE MANAGEMENT

(75) Inventors: William E. Elswick, Santa Monica, CA (US); John T. Hurst, Burbank, CA (US)

(73) Assignee: Avica Technology Corporation, Santa Monica, CA (US)

( * ) Notice: Subject to any disclaimer, the term of this patent is extended or adjusted under 35 U.S.C. 154(b) by 324 days.

(21) Appl. No.: 10/091,879

(22) Filed: Mar. 5, 2002

(51) Int. Cl.[7] ................................................ H04Q 7/14
(52) U.S. Cl. ...................................... 340/7.22; 340/7.46
(58) Field of Search ........................ 340/539.13, 539.15, 340/539.16, 539.18, 7.21, 7.22, 7.23, 7.46, 7.47, 7.48; 701/11, 117; 455/521, 508

(56) References Cited

U.S. PATENT DOCUMENTS

| | | | |
|---|---|---|---|
| 4,352,412 A | * | 10/1982 | Bittar et al. ................. 187/384 |
| 5,705,980 A | * | 1/1998 | Shapiro .................. 340/539.11 |
| 6,049,272 A | * | 4/2000 | Lee et al. ............... 340/539.18 |
| 6,212,393 B1 | * | 4/2001 | Suarez et al. ............ 455/456.4 |
| 6,385,459 B1 | * | 5/2002 | Lawrence et al. .......... 455/508 |
| 6,430,496 B1 | * | 8/2002 | Smith et al. ................ 701/117 |
| 6,701,156 B2 | * | 3/2004 | Akhteruzzaman et al. .. 455/521 |
| 2002/0078007 A1 | * | 6/2002 | Herrero .......................... 707/1 |

\* cited by examiner

Primary Examiner—Edwin C. Holloway, III
(74) Attorney, Agent, or Firm—Mitchell Silberberg & Knupp LLP

(57) ABSTRACT

Provided are systems and techniques for paging multiple recipients by broadcasting a first communication to plural recipient devices. The first communication causes the recipient devices to provide a message notifying the recipients of a task that should be performed. A reply communication is received from one of the recipient devices and, in response to the reply communication, a second message is broadcast to at least one of the recipient devices. The second communication causes the recipient devices that receive it to cease providing the message.

27 Claims, 3 Drawing Sheets

BROADCAST MESSAGE MANAGEMENT

BACKGROUND OF THE INVENTION

1. Field of the Invention

The present invention concerns the management of broadcast messaging systems, such as messaging systems that are used in a computer network to alert terminals on the network to a problem or to a condition or an event that requires attention.

2. Description of the Related Art

Conventionally, broadcast messaging systems are used in a variety of contexts to simultaneously alert multiple users of the existence of a condition that has occurred. Probably the most common context in which such systems are utilized is in connection with a computer network. In this case, an error condition occurring on the network, such as the failure of a network component or the unavailability of a service, sometimes will be detected automatically by a central server. In response to such a detection, the central server might broadcast a message to some or all terminals on the network, notifying the users of the existence of the detected condition. Such notification often serves two distinct purposes: (i) notifying the users that the affected functionality is unavailable so that alternate arrangements should be made and (ii) notifying the appropriate staff (e.g., the technical staff) that the problem should be corrected.

SUMMARY OF THE INVENTION

While such conventional broadcast message techniques serve a limited purpose, the present inventor has discovered significant problems with such techniques. For instance, although such techniques are capable of simultaneously providing notice to multiple users who are capable of addressing the detected problem, such conventional techniques generally do not provide for coordination of the remediation efforts. For example, each of the technical staff members who is notified might assume that another individual will address the problem, resulting in a situation in which no one actually does. Alternatively, multiple people might respond and begin taking action to address the problem, which in the best case can result in duplication of effort and in the worst case can result in inconsistent activity that makes the problem more difficult to troubleshoot or that can even exacerbate the problem or create other problems.

In short, the results of such conventional techniques often are inefficient utilization of personnel resources, needless delay and/or the necessity to resend alert notices multiple times. Resending alert notices, in particular, can be annoying to the recipients, especially to those who are unable to do anything about the situation.

The present invention addresses these problems by sending an initial broadcast communication that notifies of a task to be performed and then, in response to a reply communication, sending a second broadcast communication that causes the recipient devices to cease providing the initial message.

Thus, in one aspect the invention is directed to paging multiple recipients by broadcasting a first communication to plural recipient devices. The first communication causes the recipient devices to provide a message notifying the recipients of a task that should be performed. A reply communication is received from one of the recipient devices and, in response to the reply communication, a second message is broadcast to at least one of the recipient devices. The second communication causes the recipient devices that receive it to cease providing the message.

By virtue of the foregoing arrangement, it is often possible to coordinate performance of certain tasks among a number of dispersed individuals. At the same time, the broadcasting of the second communication can permit many individuals to avoid having to cope with messages regarding tasks that are already of in the process of being performed or at least have been assigned for performance.

In more particularized aspects of the invention, reminder notifications are transmitted and/or a message regarding the task is re-broadcast to some or all of the original recipients. Such actions may be taken after a specified period of time, which may be fixed or variable based, for example, upon the task or upon the parameters of the response that has been accepted. As a result, great flexibility can be built into the system to accommodate situations where the task is not initially performed as anticipated.

In still further aspects of the invention, multiple replies are received and each includes an indication of the difficulty of performing the task and/or an indication of the qualifications of the responder for performing the task. Based on these indications, an appropriate individual is selected to perform the task, in a manner directed toward optimal efficiency. Such indications may be input manually, generated automatically, or any combination of the two.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

This disclosure is related to, and hereby incorporates by reference herein as though set forth herein in full, each of the following commonly-assigned patent applications: U.S. patent application Ser. No. 09/784,948 filed Feb. 15, 2001 and titled "Paging During Media Loading" (the '948 application); U.S. patent application Ser. No. 09/784,843 filed Feb. 15, 2001 and titled "Programming Content Distribution" (the '843 application); and the U.S. patent applications titled "Distributed Storage of Audio/Video Content" (the Distributed Storage Application) and "Multi-Path Content Distribution and Aggregation" (the Multi-Path Content Distribution and Aggregation Application) filed concurrently herewith.

Figure 1:
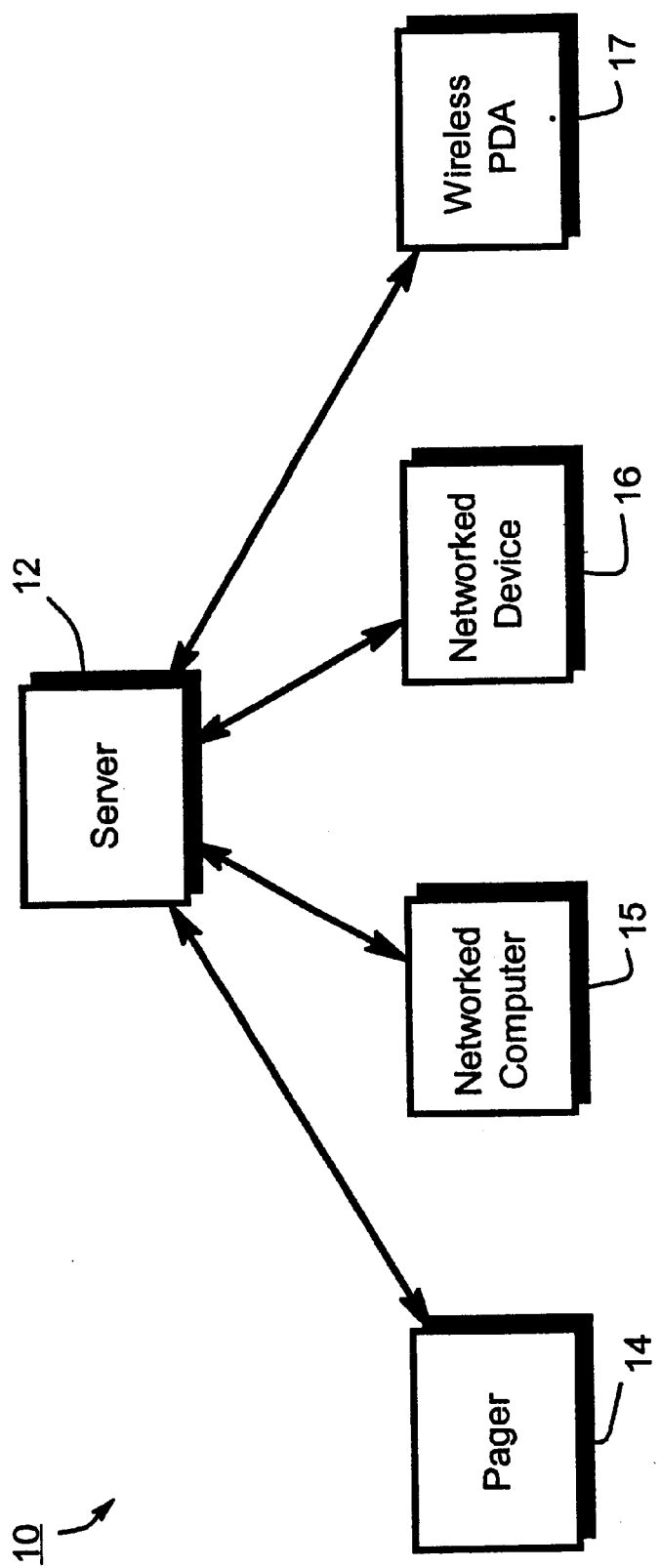
FIG. 1 is a block diagram of a system according to the present invention.

FIG. 1 is a block diagram of a system 10 for implementing techniques of broadcast message management according to a representative embodiment of the present invention. As shown in FIG. 1, system 10 includes a central server 12 and terminals 14 through 17. In the present embodiment of the invention, server 12 and terminals 14 to 17 are networked together. Such networking may entail a single network or multiple networks. However, it should be noted that any of devices 14 to 17 may connect to server 12 via a direct communications link rather than via a network. In any event, server 12 is able to communicate with each of terminals 14 to 17. Preferably, such communications are bidirectional, as shown in FIG. 1. The specific type of communication link between server 12 and each of terminals 14 to 17 is not critical and generally will depend upon the type of device that is used for the terminal.

In this regard, a variety of different terminal types may be utilized in accordance with the present invention. For example, in the representative embodiment illustrated in FIG. 1, terminal 14 is a wireless pager device, terminal 15 is a networked general-purpose computer, terminal 16 is another network device such as a special-purpose display device, and terminal 17 is a bidirectional wireless personal digital assistant (PDA). Thus, terminals 15 and 16 typically will be connected to server 12 via a hardwired network and terminals 14 and 17 will be connected to server 12 via a wireless link (and, possibly, also a hardwired network). Also, while four terminals 14 to 17 are illustrated in FIG. 1 and referenced herein, it should be understood that any other number of terminals may instead be used.

It is noted that server 12 may be a dedicated network server or else may be a network device that functions as a server for the present purposes but may function as a client device for other purposes. In fact, because the communications links between server 12 and devices 14 to 17 need not involve any network (instead using isolated communication links), server 12 might not be networked at all. Thus, the term "server" in this context is somewhat different than the meaning most commonly understood for that term.

In a representative embodiment of the present invention, server 12 is (or at least is in communication with) a media loading device, such as is described in the '948 application. Thus, for example, server 12 might detect when a current DVD is finished loading and the media loading device is ready to accept another DVD. For purposes of the following discussion, it frequently will be assumed that server 12 includes a media loading device and the condition requiring attention is the completion of loading a single DVD, requiring the removal of that DVD and the insertion of the next DVD. However, it should be understood that the present invention is not limited to this specific problem, but instead may be applied in a wide variety of circumstances.

Figure 2:
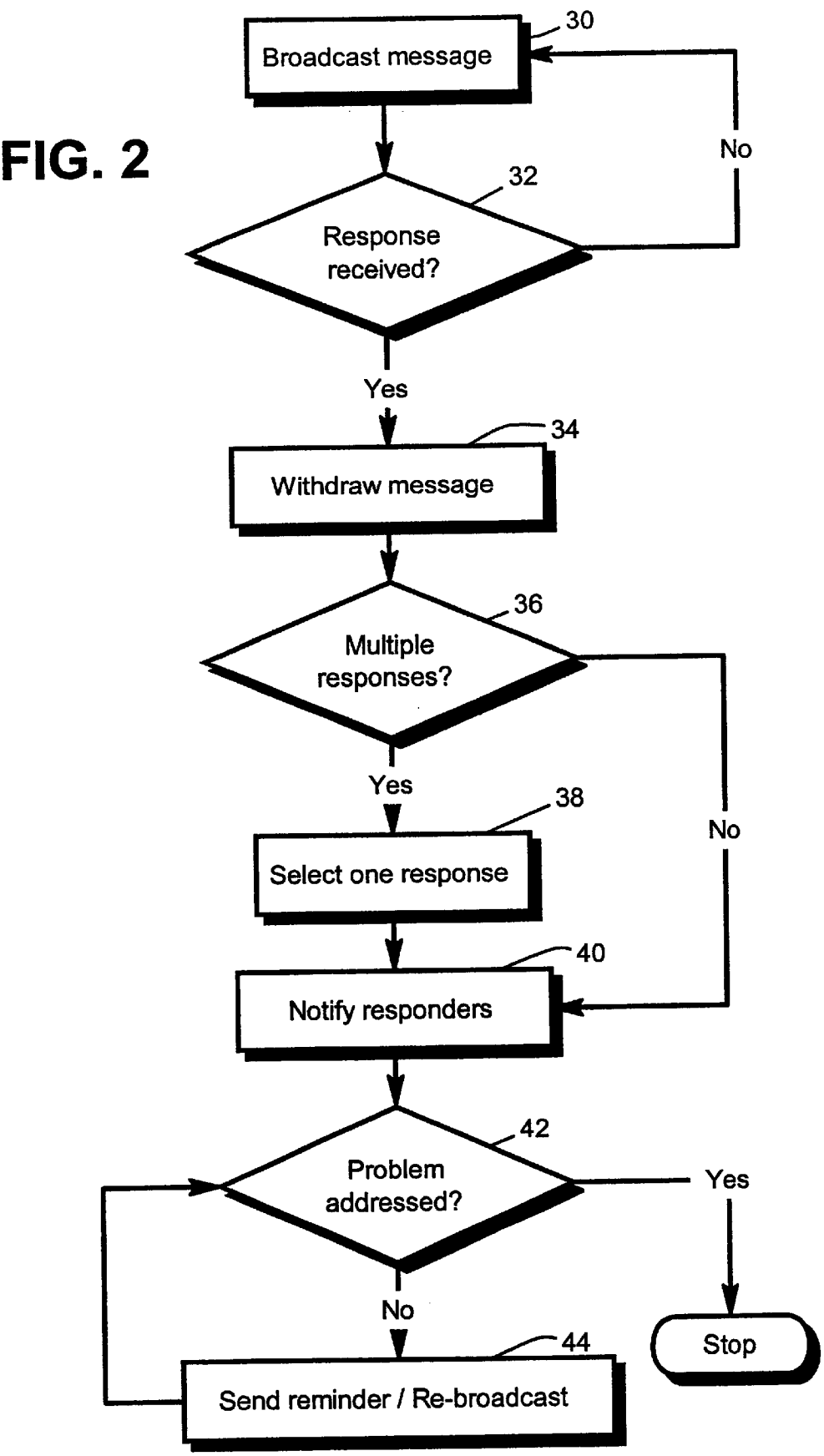
FIG. 2 is a flow diagram illustrating a technique for broadcast message management according to the present invention.

FIG. 2 is a flow diagram illustrating process steps which may be performed by server 12 upon the detection of an error condition or any other condition requiring attention.

Initially, in step 30 server 12 broadcasts a message to each of terminals 14 to 17 notifying such terminals (or recipient devices) of the condition. Upon receiving this communication from server 12, each of terminals 14 through 17 preferably immediately displays the broadcast message, as discussed below.

Upon receipt of the broadcast message, some users might respond and others might not. The responses preferably include responses that indicate a willingness and/or ability to address the condition triggering the broadcast message (e.g., loading the next DVD). Such responses might be transmitted to server 12 through the same terminal that received the broadcast message or by using any other means. For example, a user receiving a broadcast message via a one-way pager might respond by going to the nearest computer terminal and submitting a response or by going to the nearest telephone, dialing a number and then either entering a code on the telephone's keypad or speaking a response into the telephone.

In step 32, a determination is made as to whether any responses to the broadcast message sent in step 30 have been received. Preferably, this step 32 and the remainder of this discussion pertaining to FIG. 2 are only concerned with responses that indicate that the responder is available to address the problem/condition that is the subject of the broadcast message transmitted in step The determination in step 32 may be made after a specified period of time which, in turn, might be dependent upon the specific condition which triggered the broadcast message in step 30. For instance, server 12 might wait for 10 minutes if the triggering condition is the loading of the next DVD but only 1 minute if the triggering condition is a system malfunction. Such specified period of time may also be based on any other factors, such as time of day, existence of other conditions, number of personnel on duty, number of personnel on duty that are capable of responding to the problem, and/or any other factors that are likely to influence response times.

Where a specified period of time is in fact used, the time period (i) may be cut off as soon as the first response indicating availability to address to the problem is received (effectively precluding any further responses, (ii) may continue to run until the time period has expired, or (iii) may be modified (e.g., shortened) based on the receipt of any response(s). In one example of option (iii), the initial response window may be 6 minutes, but drops to three minutes in the event that the first response is received or when the first response meeting specified criteria is received. When either of options (ii) or (iii) are used, it is possible that multiple responses may be received by server 12.

If no response has been received in step 32, then processing returns to step 30 to re-broadcast the message. If at least one response has been received, then processing proceeds to step 34.

In step 34, another communication is transmitted by server 12 to at least some of terminals 14 to 17. Preferably, this communication notifies the recipient devices that a response has been received by server 12 and, therefore, the recipient devices may cease displaying the broadcast message. As described in more detail below, in certain embodiments of the invention some of the terminal devices 14 to 17 may have already cleared the broadcast message and sent a message to that effect to server 12. As a result, in these embodiments server 12 generally will not need to send the withdrawal message to such terminal devices. Otherwise, it is preferable that server 12 send this second communication to all recipient devices (e.g., devices 14 to 17) that received the original broadcast message.

In step 36, a determination is made as to whether multiple responses have been received. As indicated above, such a situation may occur for any of a number of different reasons. For example, server 12 may be configured to accept responses during a specified period of time and, during that specified period of time, multiple responses may have been received. As a further possibility, server 12 may have been configured to accept the first response received but, before server 12 is able to act on such first response, one or more additional responses are received. Of course, server 12 may be configured to react to received responses differently depending upon the circumstances. This is discussed in more detail above.

If multiple responses have in fact been received in step 36, then processing proceeds to step 38. Otherwise, the processing skips step 38 and proceeds directly to step 40.

In step 38, one of the multiple responses received by server 12 is selected as the person who will attend to the condition that was the subject of the broadcast message. In the preferred embodiment of the invention, this determination is made by difficulty and/or appropriateness indicators associated with each response received. Such difficulty indicators may be specified manually or otherwise by the users receiving the broadcast message, may be automatically assigned by the terminal devices 14 to 17 receiving the broadcast message (or any other device that the user uses to respond to the broadcast message) and/or by server 12, or may be generated based on any combination of the foregoing techniques.

For instance, a user receiving the broadcast message might manually indicate: (i) a level of difficulty for him or her to address the condition, based on, for example, how busy that user currently is or how far away the user is from server 12 or any other location that he or she would need to reach in order to address the problem, (ii) the user's employment level, position or role within the organization, or even (iii) the specific identity of the user. With regard to (ii) and (iii), it often might be more preferable to have lower-level employees perform certain tasks. On the other hand, for certain technical problems or other problems requiring special expertise, it might be preferable to have someone with more experience and/or expertise in particular subject matter address the problem.

As noted above, it is also possible to have such difficulty indicators assigned automatically, either in whole or in part. For example, it might be possible for the system to automatically determine the approximate location of a given terminal based, for example, on the known location of the network port into which the terminal is connected, the known location of the wireless transceiver with which the terminal is communicating, a triangulation technique (for wireless communications) or any other location-identifying techniques. Therefore, the distance from the location at which the condition must be addressed can be approximated automatically. Similarly, the user's information (e.g., level within the organization, experience and/or expertise) may be provided automatically based on the login information entered by the user when logging into the terminal or based on known assignments of particular terminals 14 to 17 to particular users or categories of users. Even an estimate of how busy the user is may be generated automatically by electronically monitoring cash register transactions, telephone call statistics and/or computer keystrokes and/or by utilizing any other techniques for automated measurement of work activity.

In step 38, these levels of difficulty and appropriateness for the task are aggregated and compared among the received responses to select one person to address the problem/condition. In the most simple example, a weighted average of the difficulty estimates and appropriateness values is calculated for each response (e.g., with the difficulty indicators having negative weights and the appropriateness values having positive weights) and the response with the highest overall score is selected. However, any other formulas for achieving a single score for each response may be used.

Alternatively, not all of the various separate values need not be aggregated, but instead might be compared and/or evaluated separately in order to identify the best responder. Thus, for example, a particular value in one area (e.g., technical competence) that is lower than a set threshold might automatically disqualify a particular candidate with regard a particular task.

Finally, in alternative embodiments of the invention server 12 might identify several responders, rather than just one, to handle different portions of the task that needs to be accomplished, e.g., based on the responses received. Such an embodiment might be particularly appropriate where the task to be performed is of a complicated and/or time-consuming nature and lends itself to subdivision into subtasks.

In step 40, the responders are notified. Specifically, the responder(s) who have been selected to perform tasks preferably are notified that they have been selected and, if appropriate, the tasks that they are to perform. In addition, the responders who have not been selected preferably are notified that others will be addressing the condition and/or handling the tasks. Preferably, such notifications are sent via the same communication channels that were used to broadcast the original message in step 30.

In step 42, a determination is made as to whether the originally identified problem or condition has been addressed. Preferably, this determination is made after waiting a specified (e.g., predetermined) period of time. This period of time may be fixed or may be varied based on certain factors. For example, the time period might be adjusted based on how critical it is to address the subject condition in a timely manner and/or based on the history of invoking step 44 (discussed below) with regard to the same problem/condition. If the problem/condition has been addressed or corrected, then processing is completed. Otherwise, processing proceeds to step 44.

In step 44 appropriate reminder or alert messages are sent. The processing in step 44 preferably depends upon whether the problem/condition is in the process of being addressed or corrected. If so, then processing preferably returns to step 42 without taking any additional action.

If not, then the processing in step 44 preferably depends upon the past history of invoking step 44 in connection with the current problem. Thus, for example, a reminder may be sent to the responder(s) who had been selected in step 38 that the task still needs to be performed. Alternatively, a message indicating that the problem still exists may be broadcast to all of terminals 14 to 17 (e.g., by returning to step 30 to rebroadcast the original message and continuing processing from there). Any combination of the foregoing actions may be taken in this step 44. For example, on the first one or first several invocations of step 44 in connection with the problem, reminders might be sent to the selected responders. If the problem still is not addressed, then in the next execution of step 44 the message notifying all users of the condition may be re-broadcast (e.g., by returning to step 30). It is noted that, in the preferred embodiment of the invention, any rebroadcast of the message for the same problem/ condition preferably includes a code indicating that it is such (e.g., the same identifying code embedded in the original message).

Figure 3:
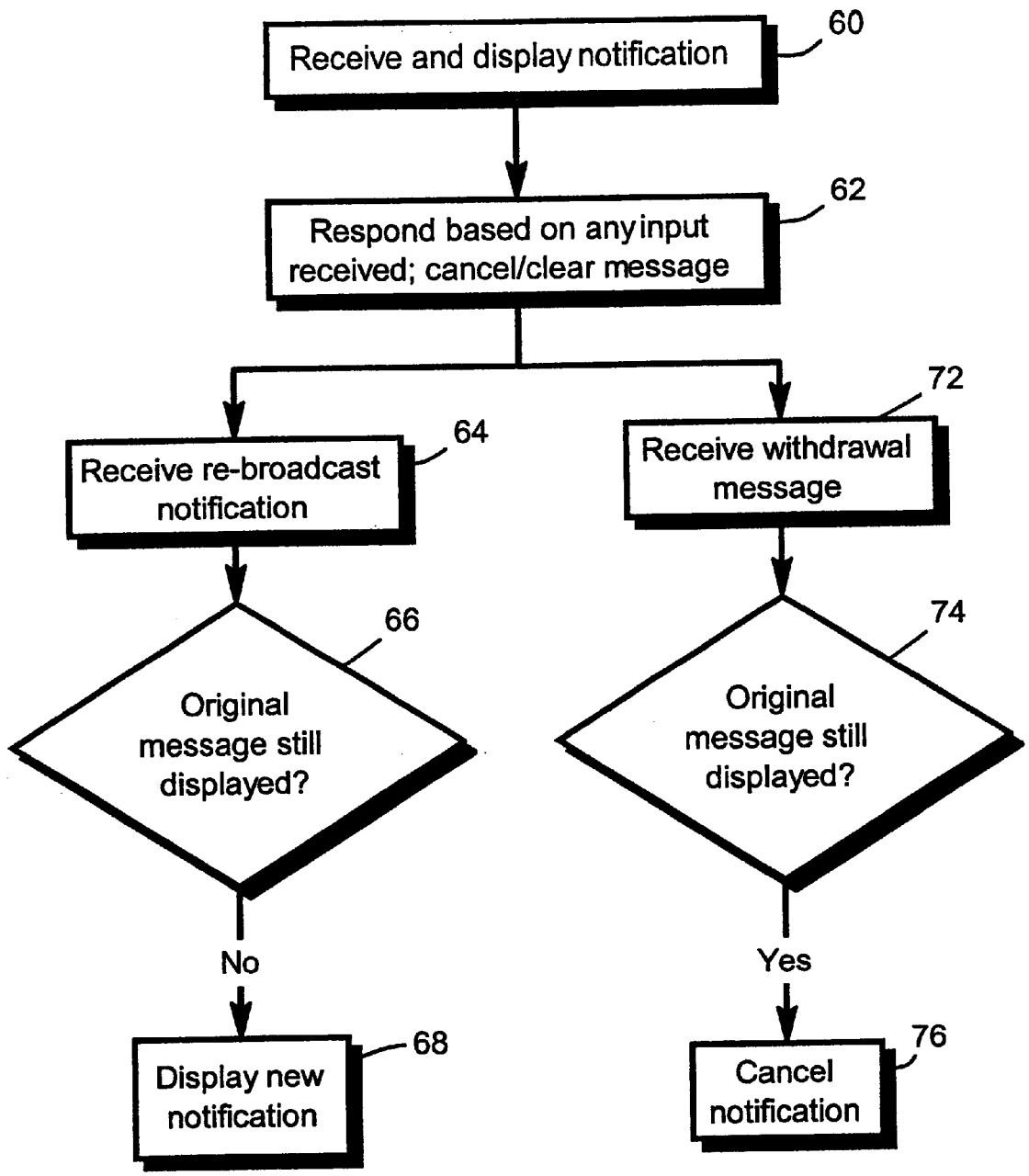
FIG. 3 is a flow diagram illustrating process steps for execution by a recipient device according to a representative embodiment of the present invention.

FIG. 3 is a flow diagram illustrating process steps that may be performed by one of terminals 14 to 17 according to a representative embodiment of the present invention. To simplify this discussion, it will be assumed that the following process steps are being performed by terminal 14.

Initially, in step 60 the message that was broadcast in step 30 is received and displayed by terminal 14. Such "display" may be entirely visual, entirely auditory or any combination of the two, or may use any other means for alerting and notifying the users assigned to such terminal devices. Moreover, different terminal devices 14 to 17 might display the message differently, depending upon the type of the receiving terminal device, the specific message, the type of the message, the preferences of the recipient device user, and/or any other factors.

In step 62, terminal 14 might transmit a response to server 12 in the event that any input that has been provided by the user in response to the broadcast message. In this regard, several possibilities exist. First, the user might not input anything in response to the broadcast message. Typically, this will be the case if the user has not even seen the broadcast message (e.g., because the user is physically distant from terminal 14 when the message is received). In this case, no response is transmitted by terminal 14 to server 12 and no other processing is performed in this step 62.

Second, the user might indicate his or her availability to respond to the condition, which indication, as noted above, might or might not include a manually designated indication of difficulty and/or appropriateness for the task. In this case, terminal device 14 transmits such information (possibly after supplementing it with, or modifying it based on, difficulty or appropriateness indicators that have been automatically generated by terminal 14, as discussed above) to server 12 for evaluation.

Finally, the user might simply clear the broadcast message from terminal 14, indicating that the user has seen the broadcast message but is unable or unwilling to address the problem. In this last case, information regarding the user's action might or might not be transmitted by terminal 14 to server 12, depending upon the particular embodiment of the present invention. As noted above, one advantage of transmitting such information is that server 12 generally will not need to transmit a message withdrawal communication in step 34 to such terminal 14. After step 62, any of several different events might occur, such as shown in steps 64 and 72.

In step 64, terminal 14 receives a communication from server 12 that terminal 14 identifies as a re-broadcast of the notification that was received in step 60. As noted above, this identification may be based on a code that is embedded in the re-broadcast message.

In step 66, a determination is made as to whether the original message is still displayed. If so, then a duplicate or similar message about the same problem/condition need not also be displayed, so no further action is taken. On the other hand, if the original message is not still displayed then in step 68 the re-broadcast notification is displayed at terminal 14.

In step 72, a communication is received by terminal 14 from server 12 indicating that the displayed message should be withdrawn. Such a message might have been sent by server 12 in step 34.

In response, in step 74 a determination is made as to whether the original message is still displayed. If so, then the message received in step 60 is canceled in step 76 (i.e., it is no longer displayed). On the other hand, if the original message is not still displayed then no further action need be taken.

In the current embodiment, step 76 cancels only the broadcast message previously received in step 60. This is because any earlier messages regarding the same problem/condition would have already been canceled. However, in alternate embodiments, a single withdrawal message from server 12 may be interpreted to cancel all messages currently displayed on device 14 pertaining to the subject problem/condition. Moreover, such a single message might be interpreted to cancel all messages currently displayed on device 14 pertaining to several different (typically, but not necessarily, related) problems/conditions. In other words, the present invention also provides for cancellation of multiple broadcast messages based on a single withdrawal message from server 12.

System Environment.

Many of the methods and techniques described herein, such as those described above for execution by server 12 or any of terminals 14 to 17, can be practiced with a general-purpose computer system. Such a computer typically will include, for example, at least some of the following interconnected components: one or more central processing units (CPUs), read-only memory (ROM), random access memory (RAM), input/output circuitry for interfacing with other devices and for connecting to one or more networks (which in turn may connect to the Internet or to any other networks), a display (such as a cathode ray tube or liquid crystal display), other output devices (such as a speaker or printer), one or more input devices (such as a mouse, stylus or other pointing device, keyboard, microphone or scanner), a mass storage unit (such as a hard disk drive), a real-time clock, a removable storage read/write device (such as for reading from and/or writing to a magnetic disk, a magnetic tape, an opto-magnetic disk, an optical disk, or the like), and a modem (which also may connect to the Internet or to any other computer or computer network via a dial-up connection). In operation, the process steps to implement the above methods may be initially stored in mass storage (e.g., the hard disk), downloaded into RAM and then executed by the CPU out of RAM, or may be initially stored in and executed directly out of RAM or ROM.

Suitable computers for use in implementing the present invention may be obtained from various vendors. Various types of computers may be used depending upon the size and complexity of the tasks. Suitable computers include mainframe computers, multiprocessor computers, workstations, personal computers, and even smaller computers such as PDAs, wireless telephones or any other networked or communications-capable appliance or device. In addition, although a general-purpose computer system has been described above, a special-purpose computer may also be used. In particular, any of the functionality described above can be implemented in software, hardware, firmware or any combination of these, with the particular implementation being selected based on known engineering tradeoffs.

It should be understood that the present invention also relates to machine-readable media on which are stored program instructions for performing the methods of this invention. Such media include, by way of example, magnetic disks, magnetic tape, optically readable media such as CD ROMs and DVD ROMs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

Additional Considerations.

The techniques described above can provide for effective broadcast message management. Variations on the above techniques are also possible. For example, in step 32 above it was noted that server 12 might wait a specified period of time before determining the number of responses that have been received, rather than simply accepting the first response received. Various factors may be considered in implementing a response receiving strategy according to the present invention. Moreover, the decision as to whether to wait additional time when an initial response has been received may be made dynamically on-the-fly. For example, if the initial response is from a person who is qualified to address the problem (if qualification is in fact an issue) and the difficulty indicators show that it would be a simple matter for the responder to perform the required task (e.g., the person is in or near the vicinity of the media loading device), then a decision may be made to simply accept that initial response and proceed to step 34. Alternatively, if the initial response indicates that the responder is not optimally qualified to perform the task or that performing the task would exceed some specified level of difficulty for that responder, then a decision may be made to wait additional time in an attempt to receive responses from more qualified individuals or from an individual who could handle the task with less difficulty. In this regard, the amount of time to wait might, for example, be selected on a sliding scale based on the qualification factors and/or difficulty indicators in the response. Alternatively, server 12 might simply wait a fixed period of time and consider all responses received within that period of time. In either case, how urgent the task is may also be considered in determining how long to wait. Thus, a suboptimal response might be accepted immediately if the task, condition or problem is critical enough. However, in such a case it might also be preferable to continue to broadcast messages and/or to leave intact the initial message in order to get assistance from a more qualified individual and/or in hopes of getting a response from somebody who could respond more quickly to address the problem.

Although the steps of FIG. 2 are shown and described in a particular order, it should be understood that this particular order is not critical. Instead, various changes are possible as will be apparent to those skilled in the art. For instance, the communication notifying terminals 14 to 17 to withdraw the broadcast message notification might be performed later in the process, such as immediately prior to or even after step 40.

In the embodiments described above, it is generally assumed that any of the users that receives the broadcast message may indicate that he or she is available to address the problem. While such an implementation might be preferable in certain cases, such as where the action to be taken is relatively simple, it might be preferable in other situations to implement more complicated procedures. For example, in certain cases it might be preferable to define two classes of message recipients: one that is capable of and has the ability to indicate ability to address the problem and another that merely needs to be notified of the problem. In such a case, responses to address the problem preferably will only be accepted from the first class of users.

In addition, the notification and message withdrawal procedures may be different for the two classes. For instance, the above-described procedures may be applicable to the first class. However, it might be preferable to send only an initial notification of the problem to the second class and then to send a follow-up notification only when the problem has been resolved. In such a case, the initial problem notification sent to the second class might include a link (e.g., a HTML hyperlink) to a site that will provide the recipient with status information regarding the problem. Alternatively, or in addition, the initial notification to the users in the second class may be followed by periodic reminders of the problem until the final notification is delivered that the problem has been resolved. In short, the entire notification schedule may be different for different classes of users.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

What is claimed is:

1. A method of paging multiple recipients, said method comprising:

broadcasting a first communication to plural recipient devices, said first communication causing the recipient devices to provide a message notifying end users of the recipient devices about a task that should be performed;

receiving a reply communication from each of a plurality of the recipient devices, each of said reply communications including an indication of the difficulty of performing the task; and in response to the reply communications: (i) selecting a recipient from among the end users to perform the task based on the indications of difficulty, and (ii) broadcasting a second communication to at least one of the recipient devices, wherein said second communication causes the recipient devices that receive it to cease providing the message.

2. A method according to claim 1, further comprising a step of broadcasting a third communication to at least one of the recipient devices in response to the reply communications, wherein said third communication causes the recipient devices that receive it to provide a second message.

3. A method according to claim 2, wherein said second message notifies that the task will be performed by another recipient.

4. A method according to claim 1, wherein at least one of the recipient devices receives the first communication via a hardwired network, and at least one of the recipient devices is at least one of a pager or a personal digital assistant and receives the first communication via a wireless link.

5. A method according to claim 1, wherein each of the reply communications notifies that the replier is willing to perform the task.

6. A method according to claim 1, further comprising a step of transmitting a third communication to only the selected recipient if the task is not performed within a specified period of time, wherein the third communication causes the recipient device of the selected recipient to provide a message notifying that the task still should be performed.

7. A method according to claim 1, further comprising a step of broadcasting a third communication to the recipient devices if the task is not performed within a specified period of time, wherein the third communication causes at least some of the recipient devices to provide a message notifying that the task still should be performed.

8. A method according to claim 1, wherein at least one of said reply communications includes at least one of the specific identity or the position of a user of the recipient device that provided said reply communication.

9. A method according to claim 1, wherein at least one of said reply communications includes information regarding ability to respond that has been automatically generated by the corresponding recipient device.

10. A method according to claim 1, wherein the indication of difficulty for at least one of said reply communications comprises a time estimate to complete the task.

11. A method according to claim 1, wherein at least one of said reply communications includes information regarding how busy a user of the recipient device that provided said reply communication is.

12. A method according to claim 1, further comprising a step of receiving at least one reply message indicating that the first communication has been viewed on one of the plural recipient devices, and wherein the second communication is sent to all of the plural recipient devices other than those from which the reply message was received.

13. A method according to claim 1, wherein the second communication is ignored if the recipient device receiving it has already canceled the message provided in response to the first communication.

14. An apparatus for paging multiple recipients, said apparatus comprising:

means for broadcasting a first communication to plural recipient devices, said first communication causing the recipient devices to provide a message notifying end users of the recipient devices about a task that should be performed;

means for receiving a reply communication from each of a plurality of the recipient devices, each of said reply communications including an indication of the difficulty of performing the task; and means for, in response to the reply communications: (i) selecting a recipient from among the end users to perform the task based on the indications of difficulty, and (ii) broadcasting a second communication to at least one of the recipient devices, wherein said second communication causes the recipient devices that receive it to cease providing the message.

15. An apparatus according to claim 14, further comprising means for broadcasting a third communication to at least one of the recipient devices in response to the reply communications, wherein said third communication causes the recipient devices that receive it to provide a second message, and wherein said second message notifies that the task will be performed by another recipient.

16. An apparatus according to claim 14, wherein at least one of said reply communications includes at least one of the specific identity or the position of a user of the recipient device that provided said reply communication.

17. An apparatus according to claim 14, wherein at least one of said reply communications includes information regarding ability to respond that has been automatically generated by the corresponding recipient device.

18. A computer-readable medium storing computer-executable process steps for paging multiple recipients, said process steps comprising steps to:

broadcast a first communication to plural recipient devices, said first communication causing the recipient devices to provide a message notifying end users of the recipient devices about a task that should be performed;

receive a reply communication from each of a plurality of the recipient devices, each of said reply communications including an indication of the difficulty of performing the task; and in response to the reply communications: (i) select a recipient from among the end users to perform the task based on the indications of difficulty, and (ii) broadcast a second communication to at least one of the recipient devices, wherein said second communication causes the recipient devices that receive it to cease providing the message.

19. A computer-readable medium according to claim 18, wherein said process steps further comprise a step to broadcast a third communication to at least one of the recipient devices in response to the reply communications, wherein said third communication causes the recipient devices that receive it to provide a second message, and wherein said second message notifies that the performed will be performed by another recipient.

20. A computer-readable medium according to claim 18, wherein at least one of said reply communications includes at least one of the specific identity or the position of a user of the recipient device that provided said reply communication.

21. A computer-readable medium according to claim 18, wherein at least one of said reply communications includes information regarding ability to respond that has been automatically generated by the corresponding recipient device.

22. A method according to claim 1, wherein said indication of difficulty includes information that has been input by a user of the corresponding recipient device.

23. An apparatus according to claim 14, wherein said indication of difficulty includes information that has been input by a user of the corresponding recipient device.

24. A computer-readable medium according to claim 18, wherein said indication of difficulty includes information that has been input by a user of the corresponding recipient device.

25. A method according to claim 1, wherein each of plural of the recipient devices comprises at least one of a pager or a personal digital assistant and receives the first communication via a wireless link.

26. An apparatus according to claim 14, wherein each of plural of the recipient devices comprises at least one of a pager or a personal digital assistant and receives the first communication via a wireless link.

27. A computer-readable medium according to claim 18, wherein each of plural of the recipient devices comprises at least one of a pager or a personal digital assistant and receives the first communication via a wireless link.

* * * * *

UNITED STATES PATENT AND TRADEMARK OFFICE
CERTIFICATE OF CORRECTION

PATENT NO. : 6,856,240 B1
DATED : February 15, 2005
INVENTOR(S) : William E. Elswick and John T. Hurst It is certified that error appears in the above-identified patent and that said Letters Patent is hereby corrected as shown below:

Column 8,
Line 20, change "modern" to -- modem --

Signed and Sealed this

Twenty-first Day of June, 2005

JON W. DUDAS
*Director of the United States Patent and Trademark Office*